US012673453B2

(12) United States Patent
Namiki et al.

(10) Patent No.: US 12,673,453 B2
(45) Date of Patent: Jul. 7, 2026

(54) DISPLAY UNIT, CONTROL DEVICE, AND INJECTION MOLDING MACHINE

(71) Applicant: SUMITOMO HEAVY INDUSTRIES, LTD., Tokyo (JP)

(72) Inventors: Takahiro Namiki, Chiba (JP); Daigo Hotta, Chiba (JP); Takuya Matsunaga, Chiba (JP); Tomohiro Hirano, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 50 days.

(21) Appl. No.: 18/460,569

(22) Filed: Sep. 3, 2023

(65) Prior Publication Data

US 2024/0131759 A1    Apr. 25, 2024
US 2024/0227262 A9    Jul. 11, 2024

(30) Foreign Application Priority Data

Oct. 20, 2022    (JP) ................................. 2022-168529

(51) Int. Cl.
*B29C 45/17*        (2006.01)
*B29C 45/76*        (2006.01)
*B29C 45/77*        (2006.01)

(52) U.S. Cl.
CPC ...... *B29C 45/1774* (2013.01); *B29C 45/7653* (2013.01); *B29C 45/77* (2013.01); *B29C 2945/76498* (2013.01); *B29C 2945/76505* (2013.01); *B29C 2945/76605* (2013.01)

(58) Field of Classification Search
CPC . B29C 45/1774; B29C 45/7653; B29C 45/77; B29C 2945/76498; B29C 2945/76505; B29C 2945/76605; B29C 45/76; B29C 2045/7606; B29C 45/766; G05B 2219/45244; G05B 2219/32128
See application file for complete search history.

(56) References Cited

U.S. PATENT DOCUMENTS

| | | | |
|---|---|---|---|
| 6,526,360 B1 | 2/2003 | Ito et al. | |
| 7,519,450 B2 | 4/2009 | Yamaura et al. | |
| 2001/0026031 A1* | 10/2001 | Onishi | B29C 45/77 |
| | | | 425/149 |
| 2003/0082255 A1* | 5/2003 | Konishi | B29C 45/76 |
| | | | 425/173 |

(Continued)

FOREIGN PATENT DOCUMENTS

| | | |
|---|---|---|
| CN | 104325613 A | 2/2015 |
| DE | 102 47 565 A1 | 10/2003 |

(Continued)

OTHER PUBLICATIONS

Office Action of the corresponding DE 102023126093.6 mailed on Oct. 22, 2025.

(Continued)

*Primary Examiner* — Eric J Yoon
(74) *Attorney, Agent, or Firm* — WTA IP Law P.C.

(57)        ABSTRACT

A display unit displays a display screen including information on injection molding, and the display screen displays a setting screen portion that displays setting contents of the injection molding and a power screen portion that displays information on power consumption of the injection molding based on the setting contents together.

14 Claims, 7 Drawing Sheets

(56)                     References Cited

U.S. PATENT DOCUMENTS

| | | | | |
|---|---|---|---|---|
| 2006/0017416 A1* | 1/2006 | Konno | ............... | B29C 45/7666 |
| | | | | 318/645 |
| 2012/0173459 A1* | 7/2012 | Hwang | ................. | G06Q 50/06 |
| | | | | 705/412 |
| 2013/0282180 A1* | 10/2013 | Layton | .................. | G05B 15/02 |
| | | | | 700/275 |
| 2019/0018579 A1* | 1/2019 | Moss | ................... | B29C 45/766 |

FOREIGN PATENT DOCUMENTS

| | | | | | |
|---|---|---|---|---|---|
| EP | 3 041 656 B1 | | 6/2021 | | |
| JP | 2000-206150 A | | 7/2000 | | |
| JP | 2001145947 | * | 5/2001 | ....... | B29C 2037/906 |
| JP | 2006-021499 A | | 1/2006 | | |
| JP | 2007-083432 A | | 4/2007 | | |

OTHER PUBLICATIONS

Office Action of the corresponding JP Application No. 2022-168529 Mailed on Feb. 10, 2026.

* cited by examiner

Figure 5:
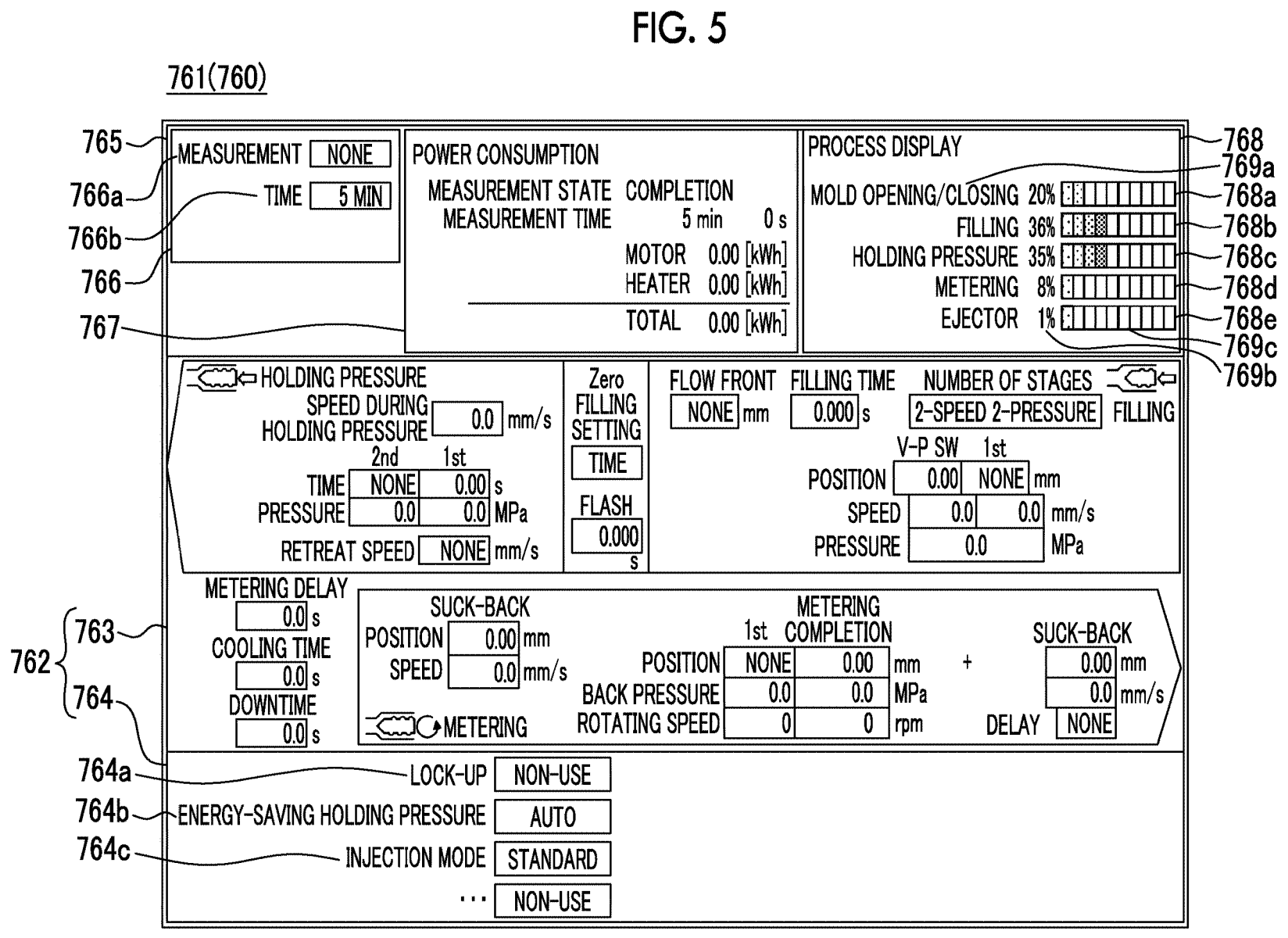

765 — MEASUREMENT [NONE]
766a — TIME [5 MIN]
766b
766
767

POWER CONSUMPTION

MEASUREMENT STATE  COMPLETION

MEASUREMENT TIME     5 min          0 s

MOTOR    0.00 [kWh]
HEATER   0.00 [kWh]
TOTAL    0.00 [kWh]

PROCESS DISPLAY

MOLD OPENING/CLOSING  20%
FILLING               36%
HOLDING PRESSURE      35%
METERING               8%
EJECTOR                1%

768
769a
768a
768b
768c
768d
768e
769c
769b

⟶ HOLDING PRESSURE

SPEED DURING
HOLDING PRESSURE    [0.0] mm/s

1st      2nd
TIME    [0.00] s  [NONE]
PRESSURE [0.0] MPa [0.0]

RETREAT SPEED  [NONE] mm/s

Zero
FILLING
SETTING   [TIME]

FLASH   [0.000] s

FLOW FRONT  [NONE] mm

FILLING TIME  [0.000] s

NUMBER OF STAGES
[2-SPEED 2-PRESSURE]  FILLING

V-P SW  1st
POSITION  [0.00] [NONE] mm
SPEED     [0.0] [0.0] mm/s
PRESSURE  [0.0] [0.0] MPa

SUCK-BACK
POSITION  [0.00] mm
SPEED     [0.0] mm/s

⟶ METERING

METERING
1st  COMPLETION
POSITION       [NONE] [0.00] mm
BACK PRESSURE  [0.0]  [0.0] MPa
ROTATING SPEED [0]    [0] rpm SUCK-BACK
[0.00] mm
[0.0] mm/s

+  DELAY  [NONE]

METERING DELAY  [0.0] s
COOLING TIME    [0.0] s
DOWNTIME        [0.0] s

763
764

LOCK-UP  [NON-USE]
ENERGY-SAVING HOLDING PRESSURE  [AUTO]
INJECTION MODE  [STANDARD]
···  [NON-USE]

762
764a
764b
764c

DISPLAY UNIT, CONTROL DEVICE, AND INJECTION MOLDING MACHINE

CROSS-REFERENCE TO RELATED APPLICATIONS

This application claims priority to Japanese Patent Application No. 2022-168529, filed on Oct. 20, 2022, which is incorporated by reference herein in its entirety.

BACKGROUND

Technical Field

Certain embodiments of the present disclosure relate to a display unit, a control device, and an injection molding machine.

Description of Related Art

The related art discloses a power consumption display unit that displays the power consumption of a machine (injection molding machine) per product manufacturing cycle. In the display unit, the average power consumption of each of power-consuming elements, such as a motor and a heater of the injection molding machine, is displayed as a stacked bar, and the bars are arranged at predetermined intervals, so that total power consumption for a predetermined period (for example, one day) is calculated.

SUMMARY

According to an aspect of the present invention, there is provided a display unit that displays a display screen including information on injection molding. The display screen displays a setting screen portion that displays setting contents of the injection molding and a power screen portion that displays information on power consumption of the injection molding based on the setting contents together.

BRIEF DESCRIPTION OF THE DRAWINGS

FIG. 5 is a diagram showing an example of a display screen of a display unit.

DETAILED DESCRIPTION

Figure 1:
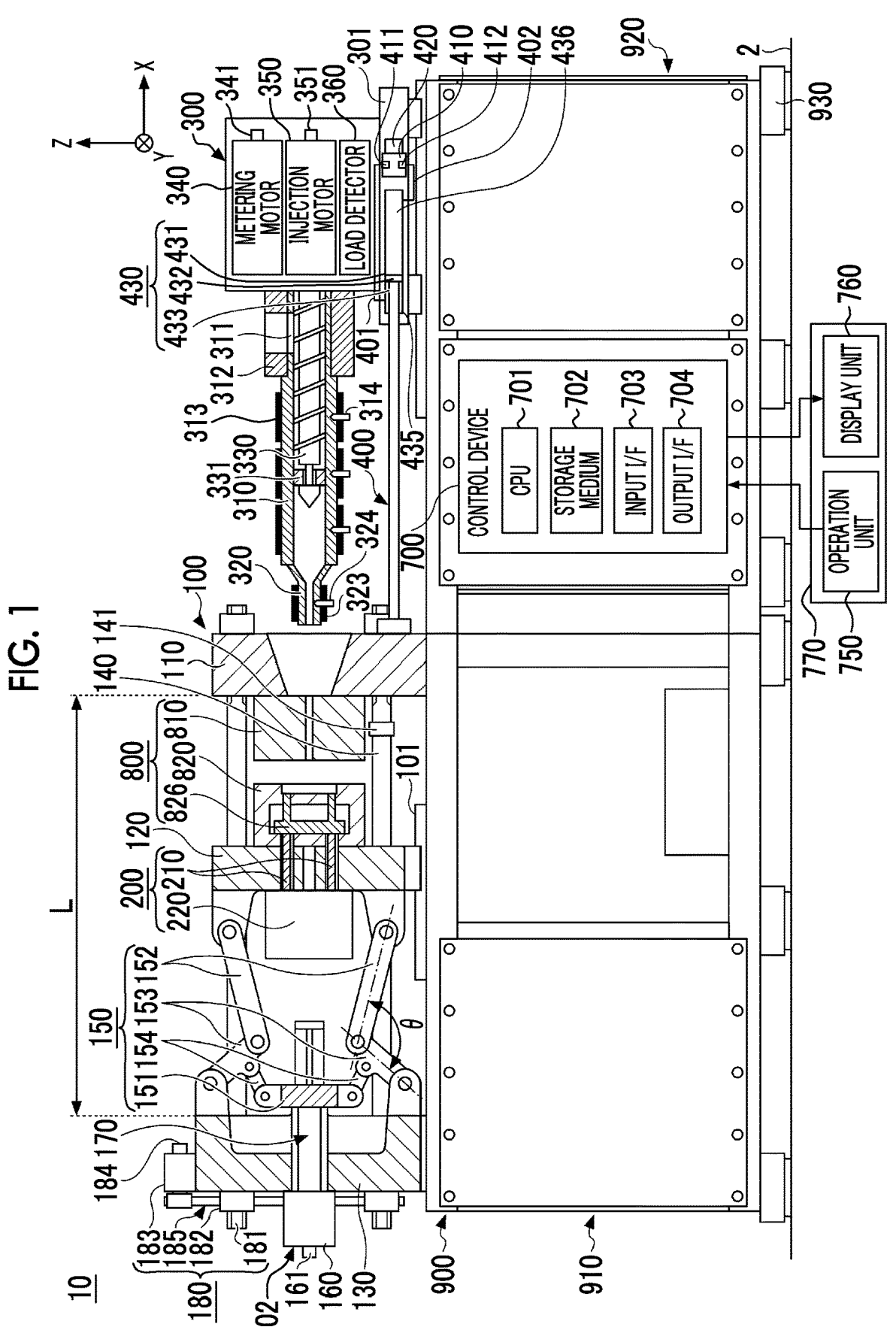
FIG. 1 is a diagram showing a state of an injection molding machine according to an embodiment at the time of completion of mold opening.

Meanwhile, in recent years, from the viewpoint of energy-saving or the like, there has been a demand for performing injection molding with setting contents in which the power consumption of injection molding is reduced. However, the display unit in the related art does not display power consumption corresponding to the setting contents of the injection molding at the time of setting of molding conditions.

It is desirable to provide a technique that allows a user to easily recognize setting contents of injection molding and power consumption corresponding to the setting contents.

Embodiments of the present disclosure will be described below with reference to the drawings. The same components will be denoted in the respective drawings by the same reference numerals, and the repeated description thereof will be omitted.

Injection Molding Machine

Figure 2:
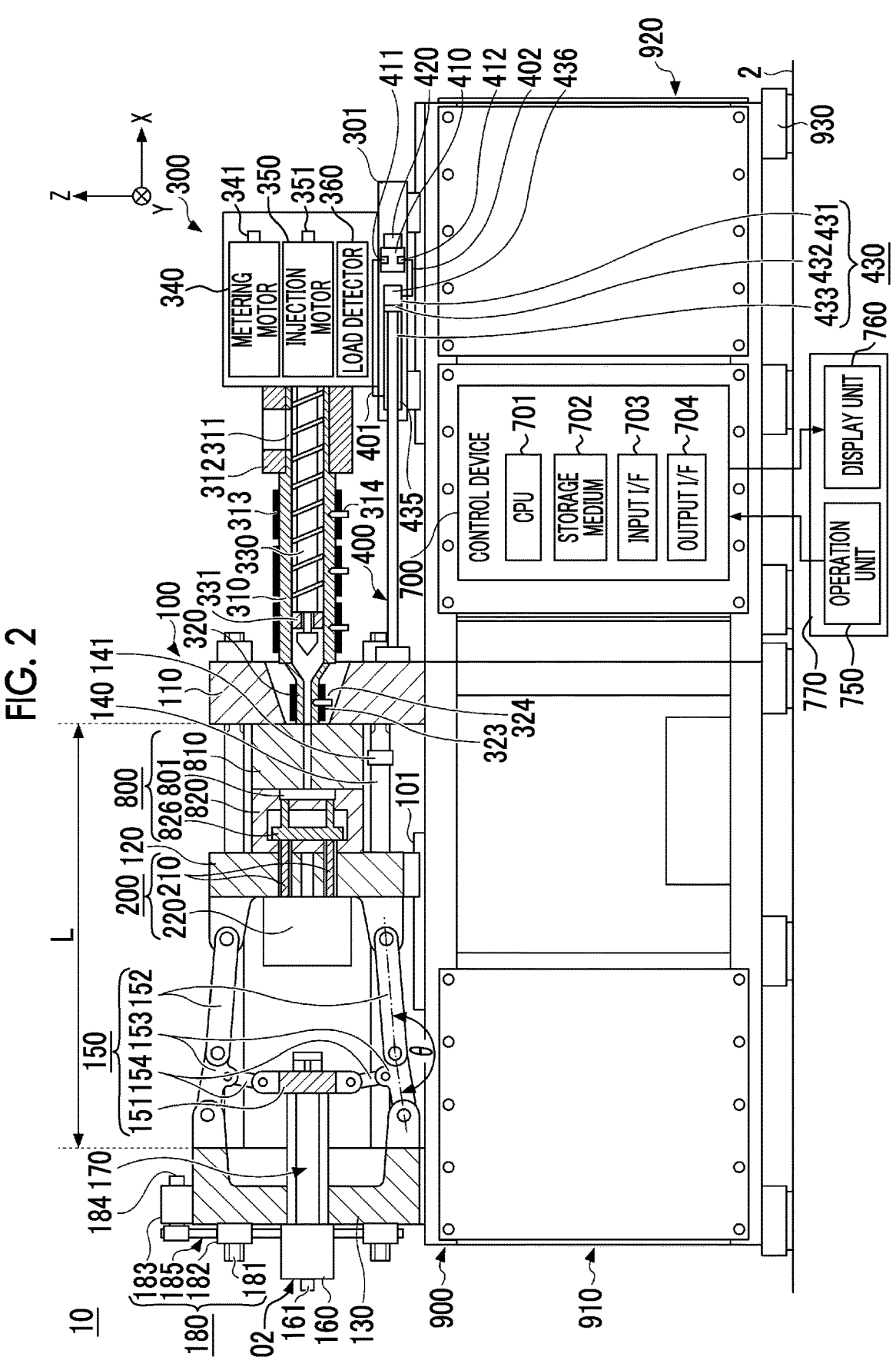
FIG. 2 is a diagram showing a state of the injection molding machine according to the embodiment at the time of mold clamping.

FIG. 1 is a diagram showing a state of an injection molding machine according to an embodiment at the time of completion of mold opening. FIG. 2 is a diagram showing a state of the injection molding machine according to the embodiment at the time of mold clamping. In this specification, an X-axis direction, a Y-axis direction, and a Z-axis direction are directions perpendicular to each other. The X-axis direction and the Y-axis direction indicate horizontal directions, and the Z-axis direction indicates a vertical direction. In a case where a mold clamping unit 100 is of a horizontal type, the X-axis direction is a mold opening/closing direction and the Y-axis direction is a width direction of an injection molding machine 10. A negative side in the Y-axis direction is referred to as an operation side, and a positive side in the Y-axis direction is referred to as a counter-operation side.

As shown in FIGS. 1 and 2, the injection molding machine 10 includes a mold clamping unit 100 that opens and closes a mold unit 800, an ejector unit 200 that ejects molding products molded by the mold unit 800, an injection unit 300 that injects a molding material into the mold unit 800, a moving unit 400 that causes the injection unit 300 to advance and retreat with respect to the mold unit 800, a control device 700 that controls the respective components of the injection molding machine 10, and a frame 900 that supports the respective components of the injection molding machine 10. The frame 900 includes a mold clamping unit frame 910 that supports the mold clamping unit 100, and an injection unit frame 920 that supports the injection unit 300. The mold clamping unit frame 910 and the injection unit frame 920 are installed on a floor 2 via leveling adjusters 930, respectively. The control device 700 is disposed in an internal space of the injection unit frame 920. The respective components of the injection molding machine 10 will be described below.

Mold Clamping Unit

In the description of the mold clamping unit 100, a moving direction of a movable platen 120 in a case where a mold is to be closed (for example, an X-axis positive direction) will correspond to a front, and a moving direction of the movable platen 120 in a case where the mold is to be opened (for example, an X-axis negative direction) will correspond to a rear.

The mold clamping unit 100 performs mold closing, pressurization, mold clamping, depressurization, and mold opening of the mold unit 800. The mold unit 800 includes a stationary mold 810 and a movable mold 820.

The mold clamping unit 100 is of, for example, a horizontal type, and the mold opening/closing direction of the mold clamping unit 100 is a horizontal direction. The mold clamping unit 100 includes a stationary platen 110 to which the stationary mold 810 is attached, the movable platen 120 to which the movable mold 820 is attached, and a moving mechanism 102 that moves the movable platen 120 with respect to the stationary platen 110 in the mold opening/closing direction.

The stationary platen 110 is fixed to the mold clamping unit frame 910. The stationary mold 810 is attached to a surface of the stationary platen 110 facing the movable platen 120.

The movable platen 120 is disposed to be movable with respect to the mold clamping unit frame 910 in the mold opening/closing direction. Guides 101 that guide the movable platen 120 are laid on the mold clamping unit frame 910. The movable mold 820 is attached to a surface of the movable platen 120 facing the stationary platen 110.

The moving mechanism 102 causes the movable platen 120 to advance and retreat with respect to the stationary platen 110 to perform mold closing, pressurization, mold clamping, depressurization, and mold opening of the mold unit 800. The moving mechanism 102 includes a toggle support 130 that is disposed with an interval between the stationary platen 110 and itself, tie bars 140 that connect the stationary platen 110 to the toggle support 130, a toggle mechanism 150 that moves the movable platen 120 with respect to the toggle support 130 in the mold opening/closing direction, a mold clamping motor 160 that operates the toggle mechanism 150, a motion conversion mechanism 170 that converts a rotary motion of the mold clamping motor 160 into a linear motion, and a mold space adjustment mechanism 180 that adjusts an interval between the stationary platen 110 and the toggle support 130.

The toggle support 130 is disposed with an interval between the stationary platen 110 and itself, and is placed on the mold clamping unit frame 910 to be movable in the mold opening/closing direction. The toggle support 130 may be disposed to be movable along guides laid on the mold clamping unit frame 910. The guides for the toggle support 130 may be common to the guides 101 for the movable platen 120.

In the present embodiment, the stationary platen 110 is fixed to the mold clamping unit frame 910, and the toggle support 130 is disposed to be movable with respect to the mold clamping unit frame 910 in the mold opening/closing direction. However, the toggle support 130 may be fixed to the mold clamping unit frame 910, and the stationary platen 110 may be disposed to be movable with respect to the mold clamping unit frame 910 in the mold opening/closing direction.

The tie bars 140 connect the stationary platen 110 to the toggle support 130 with an interval L between the stationary platen 110 and the toggle support 130 in the mold opening/closing direction. A plurality of (for example, four) tie bars 140 may be used. The plurality of tie bars 140 are disposed parallel to the mold opening/closing direction and extend depending on a mold clamping force. At least one tie bar 140 may be provided with a tie bar strain detector 141 that measures a strain of the tie bar 140. The tie bar strain detector 141 sends a signal indicating the detection result thereof to the control device 700. The detection result of the tie bar strain detector 141 may be used for the measurement of a mold clamping force, and the like.

The tie bar strain detector 141 is used in the present embodiment as a mold clamping force detector for detecting a mold clamping force, but the present invention is not limited thereto. The mold clamping force detector is not limited to a strain gauge type and may be of a piezoelectric type, a capacitive type, a hydraulic type, an electromagnetic type, or the like. A position where the mold clamping force detector is attached is also not limited to the tie bar 140.

The toggle mechanism 150 is disposed between the movable platen 120 and the toggle support 130, and moves the movable platen 120 with respect to the toggle support 130 in the mold opening/closing direction. The toggle mechanism 150 includes a crosshead 151 that moves in the mold opening/closing direction and a pair of link groups that is bent and stretched depending on the movement of the crosshead 151. Each of the pair of link groups includes a first link 152 and a second link 153 that are bendably and stretchably connected to each other by a pin or the like. The first link 152 is oscillatingly attached to the movable platen 120 by a pin or the like. The second link 153 is oscillatingly attached to the toggle support 130 by a pin or the like. The second link 153 is attached to the crosshead 151 via a third link 154. In a case where the crosshead 151 is caused to advance and retreat with respect to the toggle support 130, the first and second links 152 and 153 are bent and stretched, and the movable platen 120 advances and retreats with respect to the toggle support 130.

The configuration of the toggle mechanism 150 is not limited to the configuration shown in FIGS. 1 and 2. For example, the number of nodes of each link group is five in FIGS. 1 and 2 but may be four. One end portion of the third link 154 may be connected to the node between the first and second links 152 and 153.

The mold clamping motor 160 is attached to the toggle support 130 and operates the toggle mechanism 150. The mold clamping motor 160 causes the crosshead 151 to advance and retreat with respect to the toggle support 130, so that the first and second links 152 and 153 are bent and stretched to cause the movable platen 120 to advance and retreat with respect to the toggle support 130. The mold clamping motor 160 is directly connected to the motion conversion mechanism 170, but may be connected to the motion conversion mechanism 170 via a belt, pulleys, and the like.

The motion conversion mechanism 170 converts a rotary motion of the mold clamping motor 160 into a linear motion of the crosshead 151. The motion conversion mechanism 170 includes a screw shaft and a screw nut that is screwed to the screw shaft. Balls or rollers may be interposed between the screw shaft and the screw nut.

The mold clamping unit 100 performs a mold closing process, a pressurization process, a mold clamping process, a depressurization process, a mold opening process, and the like under the control of the control device 700.

In the mold closing process, the mold clamping motor 160 is driven to cause the crosshead 151 to advance up to a mold closing completion position at a set movement speed, so that the movable platen 120 is caused to advance and causes the movable mold 820 to touch the stationary mold 810. The position and the movement speed of the crosshead 151 are measured using, for example, a mold clamping motor encoder 161 or the like. The mold clamping motor encoder 161 measures the rotation of the mold clamping motor 160, and sends a signal indicating the detection result thereof to the control device 700.

A crosshead position detector for measuring the position of the crosshead 151 and a crosshead movement speed detector for measuring the movement speed of the crosshead 151 are not limited to the mold clamping motor encoder 161, and general detectors can be used. Further, a movable platen position detector for measuring the position of the movable platen 120 and a movable platen movement speed detector for measuring the movement speed of the movable platen 120 are not limited to the mold clamping motor encoder 161, and general detectors can be used.

In the pressurization process, the mold clamping motor 160 is further driven to further cause the crosshead 151 to advance from the mold closing completion position up to a mold clamping position and to generate a mold clamping force.

In the mold clamping process, the mold clamping motor 160 is driven to maintain the position of the crosshead 151 at the mold clamping position. In the mold clamping process, the mold clamping force generated in the pressurization process is maintained. In the mold clamping process, cavity spaces 801 (see FIG. 2) are formed between the movable mold 820 and the stationary mold 810, and the injection unit 300 fills the cavity spaces 801 with liquid molding material. Molding products are obtained in a case where the molding material filling the cavity spaces is solidified.

One cavity space 801 may be provided, or a plurality of cavity spaces 801 may be provided. In the latter case, a plurality of molding products are obtained at the same time. An insert material may be disposed in a part of each cavity space 801, and the other part of each cavity space 801 may be filled with a molding material. Molding products in which the insert material and the molding material are integrated with each other are obtained.

In the depressurization process, the mold clamping motor 160 is driven to cause the crosshead 151 to retreat from the mold clamping position up to a mold opening start position, so that the movable platen 120 is caused to retreat to reduce the mold clamping force. The mold opening start position and the mold closing completion position may be the same position.

In the mold opening process, the mold clamping motor 160 is driven to cause the crosshead 151 to retreat from the mold opening start position up to a mold opening completion position at a set movement speed, so that the movable platen 120 is caused to retreat and causes the movable mold 820 to be separated from the stationary mold 810. After that, the ejector unit 200 ejects the molding products from the movable mold 820.

Set conditions in the mold closing process, the pressurization process, and the mold clamping process are collectively set as a series of set conditions. For example, movement speeds and positions (including a mold closing start position, a movement speed switching position, a mold closing completion position, and a mold clamping position) of the crosshead 151 and mold clamping forces in the mold closing process and the pressurization process are collectively set as a series of set conditions. The mold closing start position, the movement speed switching position, the mold closing completion position, and the mold clamping position are arranged in this order from a rear side toward the front, and indicate starting points and end points of sections in which the movement speeds are set. The movement speed is set for each section. One movement speed switching position may be set, or a plurality of movement speed switching positions may be set. The movement speed switching position may not be set. Only one of the mold clamping position and the mold clamping force may be set.

Set conditions in the depressurization process and the mold opening process are also collectively set in the same manner. For example, movement speeds and positions (including the mold opening start position, the movement speed switching position, and the mold opening completion position) of the crosshead 151 in the depressurization process and the mold opening process are collectively set as a series of set conditions. The mold opening start position, the movement speed switching position, and the mold opening completion position are arranged in this order from a front side toward the rear, and indicate starting points and end points of sections in which the movement speeds are set. The movement speed is set for each section. One movement speed switching position may be set, or a plurality of movement speed switching positions may be set. The movement speed switching position may not be set. The mold opening start position and the mold closing completion position may be the same position. Further, the mold opening completion position and the mold closing start position may be the same position.

The movement speeds, the positions, and the like of the movable platen 120 may be set instead of the movement speeds, the positions, and the like of the crosshead 151. Further, a mold clamping force may be set instead of the position (for example, the mold clamping position) of the crosshead or the position of the movable platen.

The toggle mechanism 150 amplifies the driving force of the mold clamping motor 160 and transmits the amplified driving force to the movable platen 120. The amplification factor of the toggle mechanism 150 is also referred to as a toggle factor. The toggle factor is changed depending on an angle $\theta$ between the first and second links 152 and 153 (hereinafter, also referred to as a "link angle $\theta$"). The link angle $\theta$ is obtained from the position of the crosshead 151. In a case where the link angle $\theta$ is 180°, the toggle factor is at its maximum.

In a case where the thickness of the mold unit 800 is changed due to the replacement of the mold unit 800, a change in the temperature of the mold unit 800, or the like, a mold space is adjusted such that a predetermined mold clamping force is obtained during mold clamping. In the adjustment of a mold space, the interval L between the stationary platen 110 and the toggle support 130 is adjusted such that the link angle $\theta$ of the toggle mechanism 150 is a predetermined angle at a point of mold touch time when, for example, the movable mold 820 touches the stationary mold 810.

The mold clamping unit 100 includes a mold space adjustment mechanism 180. The mold space adjustment mechanism 180 adjusts the interval L between the stationary platen 110 and the toggle support 130 to adjust a mold space. A timing when a mold space is adjusted is, for example, between the end of a molding cycle and the start of the next molding cycle. The mold space adjustment mechanism 180 includes, for example, screw shafts 181 that are formed at rear end portions of the tie bars 140, screw nuts 182 that are rotatably held by the toggle support 130 not to be capable of advancing and retreating, and a mold space adjustment motor 183 that rotates the screw nuts 182 screwed to the screw shafts 181.

The screw shaft 181 and the screw nut 182 are provided for each tie bar 140. A rotational driving force of the mold space adjustment motor 183 may be transmitted to a plurality of screw nuts 182 via a rotational driving force transmission unit 185. The plurality of screw nuts 182 can be rotated in synchronization. It is also possible to individually rotate the plurality of screw nuts 182 by changing the transmission channel of the rotational driving force transmission unit 185.

The rotational driving force transmission unit 185 includes, for example, gears and the like. In this case, a driven gear is formed on an outer periphery of each screw nut 182, a driving gear is attached to an output shaft of the mold space adjustment motor 183, and an intermediate gear, which meshes with the plurality of driven gears and the driving gear, is rotatably held at a central portion of the toggle support 130. The rotational driving force transmission unit 185 may include a belt, pulleys, and the like instead of the gears.

The operation of the mold space adjustment mechanism 180 is controlled by the control device 700. The control device 700 drives the mold space adjustment motor 183 to rotate the screw nuts 182. As a result, the position of the toggle support 130 with respect to the tie bars 140 is adjusted, so that the interval L between the stationary platen 110 and the toggle support 130 is adjusted. A plurality of mold space adjustment mechanisms may be used in combination.

The interval L is measured using a mold space adjustment motor encoder 184. The mold space adjustment motor encoder 184 measures an amount of rotation and a rotation direction of the mold space adjustment motor 183, and sends signals indicating the detection results thereof to the control device 700. The detection results of the mold space adjustment motor encoder 184 are used for the monitoring and control of the position of the toggle support 130 and the interval L. A toggle support position detector for measuring the position of the toggle support 130 and an interval detector for measuring the interval L are not limited to the mold space adjustment motor encoder 184, and general detectors can be used.

The mold clamping unit 100 may include a mold temperature control machine that adjusts the temperature of the mold unit 800. The mold unit 800 includes a flow channel for a temperature control medium therein. The mold temperature control machine adjusts the temperature of a temperature control medium, which is supplied to the flow channel of the mold unit 800, to adjust the temperature of the mold unit 800.

The mold clamping unit 100 of the present embodiment is of a horizontal type in which a mold opening/closing direction is a horizontal direction, but may be of a vertical type in which a mold opening/closing direction is a vertical direction.

The mold clamping unit 100 of the present embodiment includes the mold clamping motor 160 as a drive unit, but may include a hydraulic cylinder instead of the mold clamping motor 160. Further, the mold clamping unit 100 may include a linear motor for opening and closing the mold and may include an electromagnet for clamping the mold.

Ejector Unit

In the description of the ejector unit 200, as in the description of the mold clamping unit 100, the moving direction of the movable platen 120 in a case where the mold is to be closed (for example, the X-axis positive direction) will correspond to a front, and the moving direction of the movable platen 120 in a case where the mold is to be opened (for example, the X-axis negative direction) will correspond to a rear.

The ejector unit 200 is attached to the movable platen 120, and advances and retreats together with the movable platen 120. The ejector unit 200 includes ejector rods 210 that eject the molding products from the mold unit 800, and a drive mechanism 220 that moves the ejector rods 210 in the moving direction of the movable platen 120 (X-axis direction).

The ejector rods 210 are disposed in through-holes of the movable platen 120 to be capable of advancing and retreating. Front end portions of the ejector rods 210 are in contact with an ejector plate 826 of the movable mold 820. The front end portions of the ejector rods 210 may be connected to or may not be connected to the ejector plate 826.

The drive mechanism 220 includes, for example, an ejector motor and a motion conversion mechanism that converts a rotary motion of the ejector motor into a linear motion of the ejector rods 210. The motion conversion mechanism includes a screw shaft and a screw nut that is screwed to the screw shaft. Balls or rollers may be interposed between the screw shaft and the screw nut.

The ejector unit 200 performs an ejection process under the control of the control device 700. In the ejection process, the ejector rods 210 are caused to advance up to an ejection position from a standby position at a set movement speed, so that the ejector plate 826 is caused to advance to eject the molding products. After that, the ejector motor is driven to cause the ejector rods 210 to retreat at a set movement speed and to cause the ejector plate 826 to retreat up to the original standby position.

The position and the movement speed of each ejector rod 210 are measured using, for example, an ejector motor encoder. The ejector motor encoder measures the rotation of the ejector motor, and sends a signal indicating the detection result thereof to the control device 700. An ejector rod position detector for measuring the position of each ejector rod 210 and an ejector rod movement speed detector for measuring the movement speed of each ejector rod 210 are not limited to the ejector motor encoder, and general detectors can be used.

Injection Unit

In the description of the injection unit 300, unlike in the description of the mold clamping unit 100 and the description of the ejector unit 200, a moving direction of a screw 330 during filling (for example, the X-axis negative direction) will correspond to a front, and a moving direction of the screw 330 during metering (for example, the X-axis positive direction) will correspond to a rear.

The injection unit 300 is installed on a slide base 301, and the slide base 301 is disposed to be capable of advancing and retreating with respect to the injection unit frame 920. The injection unit 300 is disposed to be capable of advancing and retreating with respect to the mold unit 800. The injection unit 300 touches the mold unit 800, and fills the cavity spaces 801 formed in the mold unit 800 with a molding material. The injection unit 300 includes, for example, a cylinder 310 that heats the molding material, a nozzle 320 that is provided at a front end portion of the cylinder 310, the screw 330 that is disposed in the cylinder 310 to be capable of advancing and retreating and to be rotatable, a metering motor 340 that rotates the screw 330, an injection motor 350 that causes the screw 330 to advance and retreat, and a load detector 360 that measures a load transmitted between the injection motor 350 and the screw 330.

The cylinder 310 heats the molding material fed from a feed port 311 to the inside. The molding material includes, for example, a resin and the like. The molding material is formed in the shape of, for example, pellets and is fed to the feed port 311 in a solid state. The feed port 311 is formed at a rear portion of the cylinder 310. A cooler 312, such as a water cooling cylinder, is provided on an outer periphery of the rear portion of the cylinder 310. First heating units 313, such as band heaters, and first temperature measurers 314 are provided on the outer periphery of the cylinder 310 in front of the cooler 312.

The cylinder 310 is divided into a plurality of zones in an axial direction of the cylinder 310 (for example, the X-axis direction). The first heating unit 313 and the first temperature measurer 314 are provided in each of the plurality of zones. A set temperature is set in each of the plurality of zones, and the control device 700 controls the first heating units 313 such that temperatures measured by the first temperature measurers 314 reach the set temperatures.

The nozzle 320 is provided at the front end portion of the cylinder 310, and is pressed against the mold unit 800. Second heating units 323 and second temperature measurers 324 are provided on an outer periphery of the nozzle 320. The control device 700 controls the second heating units 323 such that the measured temperature of the nozzle 320 reaches a set temperature.

The screw 330 is disposed in the cylinder 310 to be capable of advancing and retreating and to be rotatable. In a case where the screw 330 is rotated, a molding material is fed forward along a helical groove of the screw 330. The molding material is gradually melted by heat from the cylinder 310 while being fed forward. As the liquid molding material is fed in front of the screw 330 and is accumulated in the front portion of the cylinder 310, the screw 330 is caused to retreat. After that, in a case where the screw 330 is caused to advance, the liquid molding material accumulated in front of the screw 330 is injected from the nozzle 320 and the mold unit 800 is filled with the molding material.

A backflow prevention ring 331 is attached to a front portion of the screw 330 to be capable of advancing and retreating as a backflow prevention valve that prevents the backflow of the molding material flowing rearward from the front of the screw 330 in a case where the screw 330 is pushed forward.

In a case where the screw 330 is caused to advance, the backflow prevention ring 331 is pushed rearward by the pressure of the molding material accumulated in front of the screw 330 and retreats relative to the screw 330 up to a close position (see FIG. 2) where the flow channel for a molding material is closed. Accordingly, the molding material accumulated in front of the screw 330 is prevented from flowing back to the rear.

On the other hand, in a case where the screw 330 is rotated, the backflow prevention ring 331 is pushed forward by the pressure of the molding material fed forward along the helical groove of the screw 330 and advances relative to the screw 330 up to an open position (see FIG. 1) where the flow channel for a molding material is opened. Accordingly, the molding material is fed in front of the screw 330.

The backflow prevention ring 331 may be of either a co-rotation type that is rotated together with the screw 330 or a non-co-rotation type that is not rotated together with the screw 330.

The injection unit 300 may include a drive source that causes the backflow prevention ring 331 to advance and retreat with respect to the screw 330 between the open position and the close position.

The metering motor 340 rotates the screw 330. A drive source that rotates the screw 330 is not limited to the metering motor 340, and may be, for example, a hydraulic pump or the like.

The injection motor 350 causes the screw 330 to advance and retreat. A motion conversion mechanism that converts a rotary motion of the injection motor 350 into a linear motion of the screw 330, and the like are provided between the injection motor 350 and the screw 330. The motion conversion mechanism includes, for example, a screw shaft and a screw nut that is screwed to the screw shaft. Balls, rollers, or the like may be provided between the screw shaft and the screw nut. A drive source that causes the screw 330 to advance and retreat is not limited to the injection motor 350, and may be, for example, a hydraulic cylinder or the like.

The load detector 360 measures a load that is transmitted between the injection motor 350 and the screw 330. The measured load is converted into a pressure by the control device 700. The load detector 360 is provided in a transmission channel for a load between the injection motor 350 and the screw 330, and measures a load that acts on the load detector 360.

The load detector 360 sends a signal of the measured load to the control device 700. The load measured by the load detector 360 is converted into a pressure that acts between the screw 330 and the molding material, and is used for the control and monitoring of a pressure that is received by the screw 330 from the molding material, a back pressure that acts on the screw 330, a pressure that acts on the molding material from the screw 330, and the like.

A pressure detector that measures the pressure of the molding material is not limited to the load detector 360, and a general detector can be used. For example, a nozzle pressure sensor or a mold internal pressure sensor may be used. The nozzle pressure sensor is installed in the nozzle 320. The mold internal pressure sensor is installed in the mold unit 800.

The injection unit 300 performs a metering process, a filling process, a holding pressure process, and the like under the control of the control device 700. The filling process and the holding pressure process may also be collectively referred to as an injection process.

In the metering process, the metering motor 340 is driven to rotate the screw 330 at a set rotating speed to feed the molding material forward along the helical groove of the screw 330. Accordingly, the molding material is gradually melted. As the liquid molding material is fed in front of the screw 330 and is accumulated in the front portion of the cylinder 310, the screw 330 is caused to retreat. A rotating speed of the screw 330 is measured using, for example, a metering motor encoder 341. The metering motor encoder 341 measures the rotation of the metering motor 340 and sends a signal indicating the detection result thereof to the control device 700. A screw rotating speed detector that measures the rotating speed of the screw 330 is not limited to the metering motor encoder 341, and a general detector can be used.

In the metering process, the injection motor 350 may be driven to apply a set back pressure to the screw 330 to limit the sudden retreat of the screw 330. The back pressure applied to the screw 330 is measured using, for example, the load detector 360. In a case where the screw 330 retreats up to a metering completion position and a predetermined amount of molding material is accumulated in front of the screw 330, the metering process is completed.

Positions and rotating speeds of the screw 330 in the metering process are collectively set as a series of set conditions. For example, a metering start position, a rotating speed switching position, and a metering completion position are set. These positions are arranged in this order from the front side toward the rear, and indicate starting points and end points of sections in which the rotating speeds are set. The rotating speed is set for each section. One rotating speed switching position may be set, or a plurality of rotating speed switching positions may be set. The rotating speed switching position may not be set. Further, a back pressure is set for each section.

In the filling process, the injection motor 350 is driven to cause the screw 330 to advance at a set movement speed and to fill the cavity spaces 801 formed in the mold unit 800 with the liquid molding material accumulated in front of the screw 330. The position and movement speed of the screw 330 are measured using, for example, an injection motor encoder 351. The injection motor encoder 351 measures the rotation of the injection motor 350 and sends a signal indicating the detection result thereof to the control device 700. In a case where the position of the screw 330 reaches a set position, the switching of the filling process to the holding pressure process (so-called V/P switching) is performed. A position where V/P switching is performed is also referred to as a V/P switching position. The set movement speed of the screw 330 may be changed depending on the position of the screw 330, a time, or the like.

Positions and movement speeds of the screw 330 in the filling process are collectively set as a series of set conditions. For example, a filling start position (also referred to as an "injection start position"), a movement speed switching position, and a V/P switching position are set. These positions are arranged in this order from the rear side toward the front, and indicate starting points and end points of sections in which the movement speeds are set. The movement speed is set for each section. One movement speed switching position may be set, or a plurality of movement speed switching positions may be set. The movement speed switching position may not be set.

An upper limit of the pressure of the screw 330 is set for each section in which the movement speed of the screw 330 is set. The pressure of the screw 330 is measured by the load detector 360. In a case where the pressure of the screw 330 is equal to or lower than a setting pressure, the screw 330 advances at a set movement speed. On the other hand, in a case where the pressure of the screw 330 exceeds the setting pressure, the screw 330 advances at a movement speed lower than the set movement speed so that the pressure of the screw 330 is equal to or lower than the setting pressure for the purpose of protecting the mold.

After the position of the screw 330 reaches the V/P switching position in the filling process, the screw 330 may be caused to temporarily stop, and the V/P switching may be then performed. Immediately before the V/P switching, instead of the screw 330 being stopped, the screw 330 may advance at a very low speed or retreat at a very low speed. Further, a screw position detector for measuring the position of the screw 330 and a screw movement speed detector for measuring the movement speed of the screw 330 are not limited to the injection motor encoder 351, and general detectors can be used.

In the holding pressure process, the injection motor 350 is driven to push the screw 330 forward to maintain the pressure of the molding material at a front end portion of the screw 330 (hereinafter, also referred to as a "holding pressure") at a setting pressure and to push a molding material remaining in the cylinder 310 toward the mold unit 800. An insufficient amount of the molding material due to cooling shrinkage inside the mold unit 800 can be replenished. The holding pressure is measured using, for example, the load detector 360. A set value of the holding pressure may be changed depending on a time that has passed from the start of the holding pressure process, or the like. A plurality of holding pressures and a plurality of holding times in which the holding pressure is held in the holding pressure process may be set, and may be collectively set as a series of set conditions.

The molding material, with which the cavity spaces 801 formed in the mold unit 800 is filled, is gradually cooled in the holding pressure process, and an inlet of the cavity spaces 801 is closed by the solidified molding material at the time of completion of the holding pressure process. This state is referred to as a gate seal, and the backflow of the molding material from the cavity spaces 801 is prevented. A cooling process is started after the holding pressure process. The molding material in the cavity spaces 801 is solidified in the cooling process. The metering process may be performed in the cooling process for the purpose of shortening a molding cycle time.

The injection unit 300 of the present embodiment is of an in-line screw type, but may be of a pre-plasticizing type or the like. A pre-plasticizing type injection unit feeds a molding material, which is melted in a plasticizing cylinder, to an injection cylinder and injects the molding material into a mold unit from the injection cylinder. A screw is disposed in the plasticizing cylinder to be rotatable and not to be capable of advancing and retreating, or a screw is disposed in the plasticizing cylinder to be rotatable and to be capable of advancing and retreating. Meanwhile, a plunger is disposed in the injection cylinder to be capable of advancing and retreating.

Further, the injection unit 300 of the present embodiment is of a horizontal type in which the axial direction of the cylinder 310 is a horizontal direction, but may be of a vertical type in which the axial direction of the cylinder 310 is a vertical direction. A mold clamping unit to be combined with a vertical type injection unit 300 may be of a vertical type or a horizontal type. Likewise, a mold clamping unit to be combined with a horizontal type injection unit 300 may be of a horizontal type or a vertical type.

Moving Unit

In the description of the moving unit 400, as in the description of the injection unit 300, the moving direction of the screw 330 during filling (for example, the X-axis negative direction) will correspond to a front, and the moving direction of the screw 330 during metering (for example, the X-axis positive direction) will correspond to a rear.

The moving unit 400 causes the injection unit 300 to advance and retreat with respect to the mold unit 800. Further, the moving unit 400 presses the nozzle 320 against the mold unit 800 to generate a nozzle touch pressure. The moving unit 400 includes a hydraulic pump 410, a motor 420 as a drive source, a hydraulic cylinder 430 as a hydraulic actuator, and the like.

The hydraulic pump 410 includes a first port 411 and a second port 412. The hydraulic pump 410 is a pump that can be rotated in both directions, and sucks hydraulic fluid (for example, oil) from any one of the first port 411 and the second port 412 and discharges the hydraulic fluid from the other thereof to generate hydraulic pressure in a case where a rotation direction of the motor 420 is changed. The hydraulic pump 410 can also suck hydraulic fluid from a tank and discharge the hydraulic fluid from any one of the first port 411 and the second port 412.

The motor 420 causes the hydraulic pump 410 to operate. The motor 420 drives the hydraulic pump 410 in a rotation direction, which corresponds to a control signal sent from the control device 700, with rotation torque corresponding to the control signal. The motor 420 may be an electric motor or may be an electric servomotor.

The hydraulic cylinder 430 includes a cylinder body 431, a piston 432, and a piston rod 433. The cylinder body 431 is fixed to the injection unit 300. The piston 432 partitions the inside of the cylinder body 431 into a front chamber 435 as a first chamber and a rear chamber 436 as a second chamber. The piston rod 433 is fixed to the stationary platen 110.

The front chamber 435 of the hydraulic cylinder 430 is connected to the first port 411 of the hydraulic pump 410 via a first flow channel 401. In a case where hydraulic fluid discharged from the first port 411 is supplied to the front chamber 435 via the first flow channel 401, the injection unit 300 is pushed forward. The injection unit 300 advances, so that the nozzle 320 is pressed against the stationary mold 810. The front chamber 435 functions as a pressure chamber that generates the nozzle touch pressure of the nozzle 320 with the pressure of the hydraulic fluid supplied from the hydraulic pump 410.

On the other hand, the rear chamber 436 of the hydraulic cylinder 430 is connected to the second port 412 of the hydraulic pump 410 via a second flow channel 402. In a case where hydraulic fluid discharged from the second port 412 is supplied to the rear chamber 436 of the hydraulic cylinder 430 via the second flow channel 402, the injection unit 300 is pushed rearward. The injection unit 300 retreats, so that the nozzle 320 is separated from the stationary mold 810.

The moving unit 400 includes the hydraulic cylinder 430 in the present embodiment, but the present invention is not limited thereto. For example, an electric motor and a motion conversion mechanism that converts a rotary motion of the electric motor into a linear motion of the injection unit 300 may be used instead of the hydraulic cylinder 430.

Control Device

The control device 700 is formed of, for example, a computer and includes a central processing unit (CPU) 701, a storage medium 702, such as a memory, an input interface 703, and an output interface 704 as shown in FIGS. 1 and 2. The control device 700 causes the CPU 701 to execute a program, which is stored in the storage medium 702, to perform various types of control. Further, the control device 700 receives a signal from the outside through the input interface 703, and transmits a signal to the outside through the output interface 704.

Figure 4:
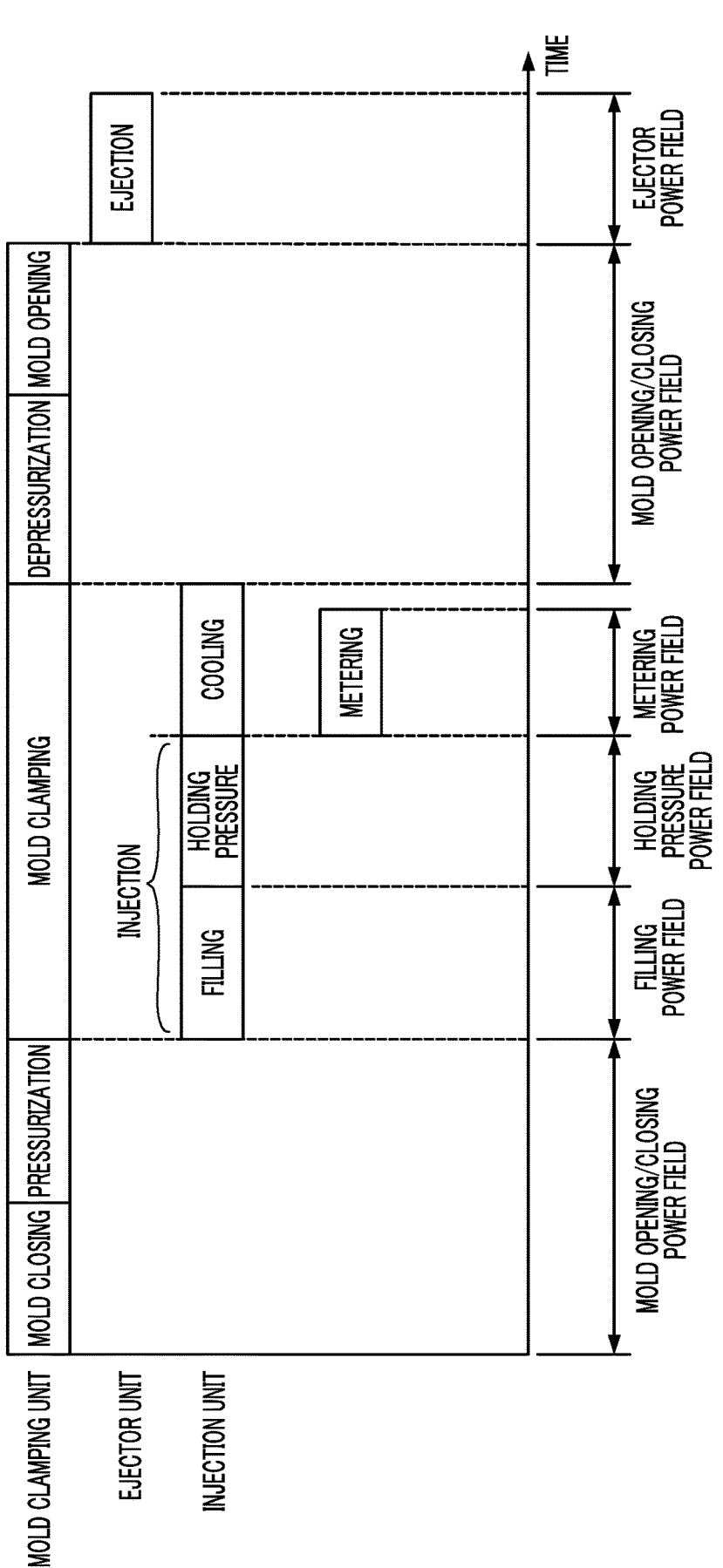
FIG. 4 is a diagram showing an example of processes of a molding cycle.

The control device 700 repeatedly performs the metering process, the mold closing process, the pressurization process, the mold clamping process, the filling process, the holding pressure process, the cooling process, the depressurization process, the mold opening process, the ejection process, and the like to repeatedly manufacture molding products (also see FIG. 4). A series of operations for obtaining molding products, for example, operations from the start of a metering process to the start of the next metering process are also referred to as a "shot" or a "molding cycle". Further, a time required for one shot is also referred to as a "molding cycle time" or a "cycle time".

One molding cycle includes, for example, the metering process, the mold closing process, the pressurization process, the mold clamping process, the filling process, the holding pressure process, the cooling process, the depressurization process, the mold opening process, and the ejection process in this order. The order mentioned here is an order in which the respective processes are started. The filling process, the holding pressure process, and the cooling process are performed during the mold clamping process. The start of the mold clamping process may coincide with the start of the filling process. The completion of the depressurization process may coincide with the start of the mold opening process.

A plurality of processes may be simultaneously performed for the purpose of shortening a molding cycle time. For example, a metering process may be performed during a cooling process of a previous molding cycle, or may be performed during a mold clamping process. In this case, the mold closing process may be performed at the beginning of the molding cycle. Further, the filling process may be started during the mold closing process. Furthermore, the ejection process may be started during the mold opening process. In a case where an on-off valve for opening and closing a flow channel of the nozzle 320 is provided, the mold opening process may be started during the metering process. The reason for this is that a molding material does not leak from the nozzle 320 as long as the on-off valve closes the flow channel of the nozzle 320 even though the mold opening process is started during the metering process.

One molding cycle may include processes other than the metering process, the mold closing process, the pressurization process, the mold clamping process, the filling process, the holding pressure process, the cooling process, the depressurization process, the mold opening process, and the ejection process.

For example, a pre-metering suck-back process for causing the screw 330 to retreat up to a preset metering start position may be performed before the start of the metering process after the completion of the holding pressure process. Since the pressure of the molding material accumulated in front of the screw 330 can be reduced before the start of the metering process, the sudden retreat of the screw 330 at the time of start of the metering process can be prevented.

Further, a post-metering suck-back process for causing the screw 330 to retreat up to a preset filling start position (also referred to as an "injection start position") may be performed before the start of the filling process after the completion of the metering process. Since the pressure of the molding material accumulated in front of the screw 330 can be reduced before the start of the filling process, the leakage of the molding material from the nozzle 320 before the start of the filling process can be prevented.

The control device 700 is connected to an operation unit 750 that receives an input operation performed by a user and to a display unit 760 that displays a screen. The operation unit 750 and the display unit 760 may be formed of, for example, a touch panel 770 and may be integrated with each other. The touch panel 770 as the display unit 760 displays a screen under the control of the control device 700. For example, information, such as the settings of the injection molding machine 10 and the current state of the injection molding machine 10, is displayed on the screen of the touch panel 770. Further, for example, operation sections, such as buttons or input fields used to receive an input operation performed by a user, may be displayed on the screen of the touch panel 770. The touch panel 770 as the operation unit 750 detects an input operation performed on the screen by a user, and outputs a signal corresponding to the input operation to the control device 700. Accordingly, for example, a user can operate the operation section provided on the screen to set the injection molding machine 10 (including the input of a set value) while checking information displayed on the screen. Further, a user can operate the operation section provided on the screen to cause the operation of the injection molding machine 10, which corresponds to the operation section, to be performed. The operation of the injection molding machine 10 may be, for example, the operation (also including stopping) of the mold clamping unit 100, the ejector unit 200, the injection unit 300, the moving unit 400, or the like. Further, the operation of the injection molding machine 10 may be the switching of the screen that is displayed on the touch panel 770 as the display unit 760, or the like.

The operation unit 750 and the display unit 760 of the present embodiment have been described as being integrated as the touch panel 770, but may be provided independently of each other. Further, a plurality of operation units 750 may be provided. The operation unit 750 and the display unit 760 are disposed on an operation side (Y-axis negative direction) of the mold clamping unit 100 (more specifically, the stationary platen 110).

Details of Control Device

Figure 3:
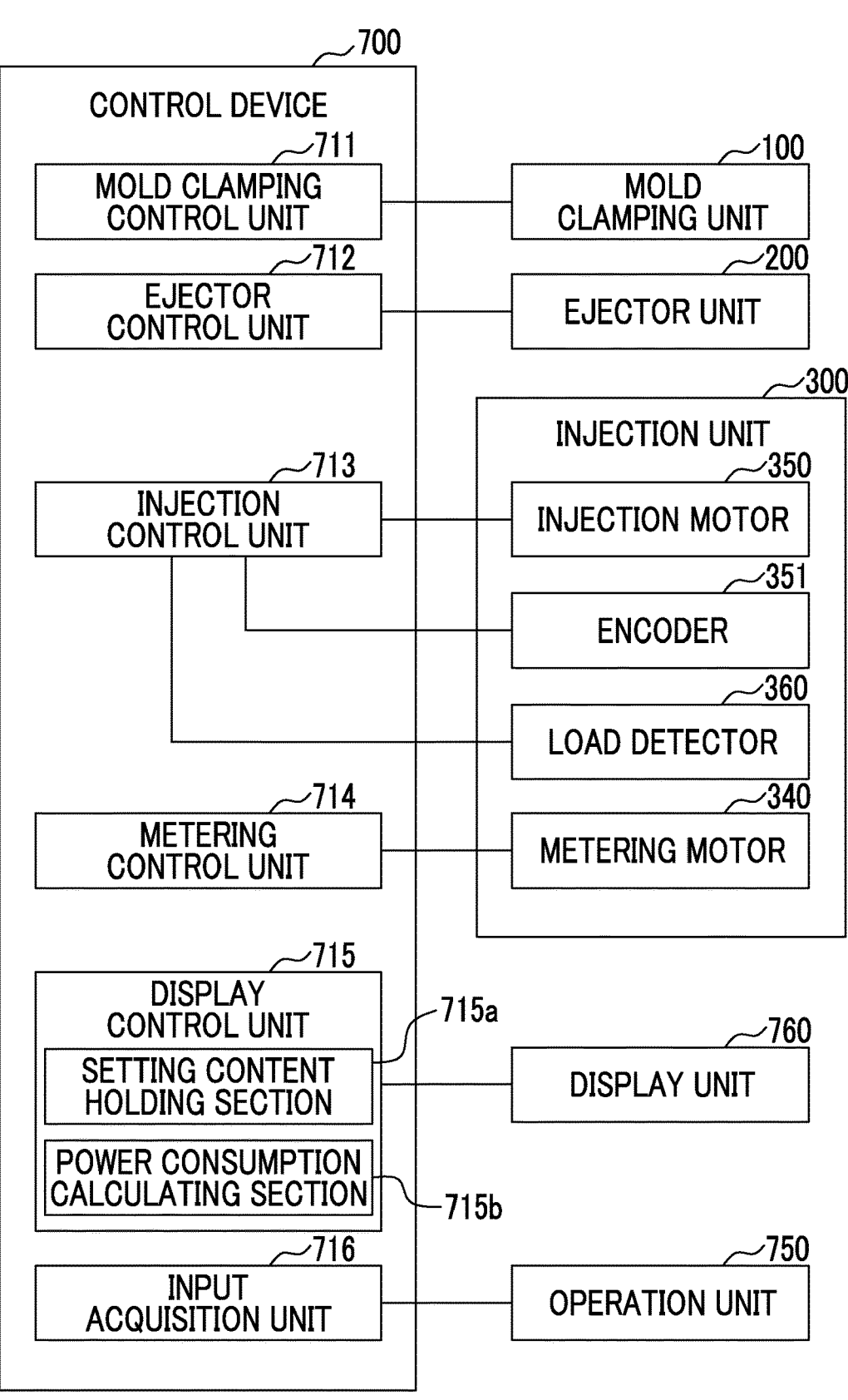
FIG. 3 is a diagram showing an example of components of a control device as functional blocks.

Next, an example of components of the control device 700 will be described with reference to FIG. 3. The respective functional blocks shown in FIG. 3 are conceptual and do not necessarily need to be physically configured as shown. All or a part of the respective functional blocks can be functionally or physically distributed and integrated as any unit. All or any part of each processing function performed by each functional block may be realized by a program executed by a CPU, or may be realized as hardware by a wired logic.

As shown in FIG. 3, the control device 700 includes, for example, a mold clamping control unit 711, an ejector control unit 712, an injection control unit 713, a metering control unit 714, a display control unit 715, and an input acquisition unit 716. The mold clamping control unit 711 controls the mold clamping unit 100, and performs the mold closing process, the pressurization process, the mold clamping process, the depressurization process, and the mold opening process shown in FIG. 4. The ejector control unit 712 controls the ejector unit 200 and performs the ejection process. The injection control unit 713 controls an injection drive source of the injection unit 300 and performs the injection process. The injection drive source is, for example, the injection motor 350 but may be a hydraulic cylinder or the like. The injection process includes the filling process and the holding pressure process. The injection process is performed during the mold clamping process. The metering control unit 714 controls a metering drive source of the injection unit 300 and performs the metering process. The metering drive source is, for example, the metering motor 340 but may be a hydraulic pump or the like. The metering process is performed during the cooling process.

The filling process is a process for controlling the injection drive source such that an actual result value of a movement speed of an injection member provided in the cylinder 310 reaches a set value. The filling process is a process for filling the inside of the mold unit 800 with liquid molding material (for example, a resin), which is accumulated in front of the injection member, by moving the injection member forward. The injection member is, for example, the screw 330 but may be a plunger.

The movement speed of the injection member is measured using a speed detector. The speed detector is, for example, the injection motor encoder 351. In a case where the injection member advances in the filling process, pressure acting on the molding material from the injection member is increased. The filling process may include a process for temporarily stopping the injection member or a process for causing the injection member to retreat, immediately before the holding pressure process.

The holding pressure process is a process for controlling the injection drive source such that an actual result value of pressure acting on the molding material from the injection member reaches a set value. The holding pressure process is a process for replenishing an insufficient amount of molding material due to cooling shrinkage in the mold unit 800 by pushing the injection member forward. The pressure is measured using a pressure detector, such as the load detector 360. A nozzle pressure sensor or a mold internal pressure sensor may be used as the pressure detector.

Further, the display control unit 715 of the control device 700 transmits information on a display screen related to the injection molding to cause the display unit 760 to display the information before the start of the injection molding, during each process in the injection molding, after the end of the injection molding, and the like. A plurality of display screens can be prepared, and the display control unit 715 allows the screens to be switched and displayed and allows the screens to be superimposed and displayed.

In addition, the input acquisition unit 716 of the control device 700 acquires information on operation contents in which a user operates the operation unit 750, on the basis of the display screen displayed on the display unit 760. For example, in a case where setting contents of the injection molding are changed by a user, the input acquisition unit 716 stores the setting contents in the storage medium 702.

Next, an example of a display screen 761 displayed on the display unit 760 will be described with reference to FIG. 5.

The display screen 761 displays a setting screen portion 762 that displays the setting contents of the injection molding of the injection molding machine 10, and a power screen portion 765 that displays information on power consumption of the injection molding based on the setting contents, together. The information on the power consumption will be described in detail later, and examples of the information on the power consumption include the display of a numerical value of the power consumption, the display of a ratio thereof, the display of a graph thereof, and the like. The power screen portion 765 is disposed above the setting screen portion 762 on the display screen 761 shown in FIG. 5 to make it easy for a user to visually recognize power consumption. "Display together" in this specification refers to a display form in which two screen portions (the setting screen portion 762 and the power screen portion 765) can be visually recognized on the same screen even though a user does not perform a manual operation for switching the screen portions. Accordingly, in addition to a form in which the setting screen portion 762 and the power screen portion 765 are displayed side by side in a vertical direction as shown in FIG. 5, the setting screen portion 762 and the power screen portion 765 may be displayed to be away from each other (such that another screen portion is interposed between the two screen portions). Moreover, on the display screen 761, the power screen portion 765 may be disposed below the setting screen portion 762, or the power screen portion 765 and the setting screen portion 762 may be disposed side by side in a horizontal direction.

With regard to the displayed setting contents of the injection molding, the setting screen portion 762 can be changed on the basis of a user's operation. The setting screen portion 762 includes a main setting screen portion 763 in which the setting contents of the injection molding can be adjusted according to user's operations, such as an input of a numerical value and the selection of options, and an auxiliary setting screen portion 764 in which molding conditions other than the setting contents of the main setting screen portion 763 can be changed. In the setting screen portion 762 shown in FIG. 5, both the main setting screen portion 763 and the auxiliary setting screen portion 764 are displayed together. The setting screen portion 762 is not limited thereto, and may be adapted to display only one of the main setting screen portion 763 and the auxiliary setting screen portion 764.

The main setting screen portion 763 is adapted such that the operation contents of various motors or heaters of the injection molding machine 10 can be adjusted. Setting contents in the holding pressure process, the filling process, and the metering process of the injection unit 300 are displayed in the main setting screen portion 763 shown in FIG. 5. A region of the holding pressure process displayed in the main setting screen portion 763 shows the operation contents (a speed during holding pressure, a retreat speed, and the like) of the screw 330 in the holding pressure process of the injection molding, and is adapted such that the operation contents can be set. For example, in a case where a speed during holding pressure or a process speed is changed by a user, the operation of the screw 330 in the holding pressure process is changed and power consumption is also changed. A region of the filling process displayed in the main setting screen portion 763 shows the operation contents (the V/P switching position, the movement speed, pressure, and the like) of the screw 330 in the filling process of the injection molding, and is adapted such that the operation contents can be set. For example, in a case where the V/P switching position, the movement speed, or pressure is changed by a user, the operation of the screw 330 in the filling process is changed and power consumption is also changed. A region of the metering process displayed in the main setting screen portion 763 shows the operation contents (the switching of the pre-metering suck-back process and the post-metering suck-back process, the rotating speed, and the like) of the screw 330 in the metering process of the injection molding, and is adapted such that the operation contents can be set. For example, in a case where the switching of the pre-metering suck-back process and the post-metering suck-back process or the rotating speed is changed by a user, the operation of the screw 330 in the metering process is changed and power consumption is also changed.

In FIG. 5, the main setting screen portion 763 does not display the setting of a mold clamping force of the mold clamping unit 100 in the mold clamping process and the setting of the ejector unit 200 in the ejection process. The reason for this is that the setting of a mold clamping force of the mold clamping unit 100 and the setting of the ejector unit 200 require adjustment work after the setting change for security. Of course, the display unit 760 is not limited thereto, and may be adapted such that the setting of the mold clamping process or the setting of the ejection process is displayed on the display screen 761 and can be changed.

The auxiliary setting screen portion 764 is a screen that allows a user to set the operation contents affecting the power consumption of the injection molding as described above. For example, the auxiliary setting screen portion 764 includes a lock-up setting field 764a, an energy-saving holding pressure-setting field 764b, and an injection mode-setting field 764c. The auxiliary setting screen portion 764 may include various setting fields in addition to the lock-up setting field 764a, the energy-saving holding pressure-setting field 764b, and the injection mode-setting field 764c.

The lock-up setting field 764a is adapted such that the use and non-use of the lock-up of the mold clamping process by the mold clamping unit 100 can be switched. Here, the lock-up refers to an operation for stopping the operation of the mold clamping motor 160 or reducing the torque of the mold clamping motor 160 in the mold clamping process by locking the toggle mechanism 150 in the pressurization process before the mold clamping process.

Figure 6B:
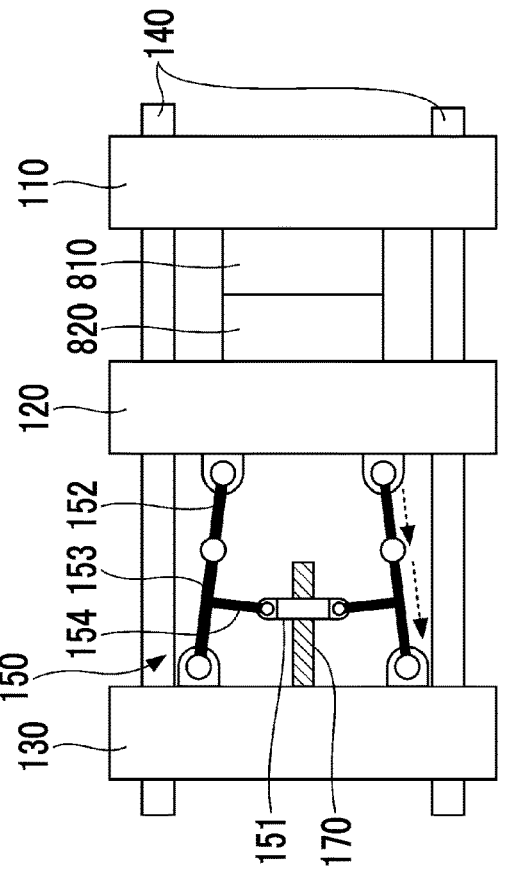
FIG. 6B is a diagram illustrating a mold clamping state in a case where lock-up is executed.
Figure 6A:
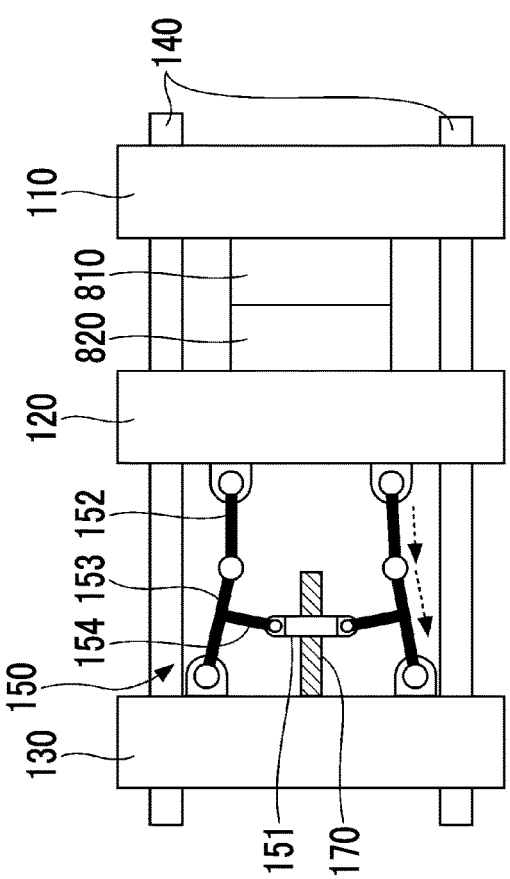
FIG. 6A is a diagram illustrating a mold clamping state in a case where lock-up is not executed.

For example, in a case where the lock-up is not executed in the mold clamping process, the toggle mechanism 150 sets the link angle θ (see FIG. 2) between the first link 152 and the second link 153 to an angle smaller than 180° as shown in FIG. 6A. Accordingly, since a reaction force from the movable platen 120 is bent and transmitted, the first link 152 and the second link 153 are easily bent in the depressurization process after the end of the mold clamping process. For this reason, the movable platen 120 and the movable mold 820 smoothly retreat. However, in a case where the lock-up is not executed, it is necessary to continuously drive the mold clamping motor 160 with high torque in order to maintain the mold clamping state of the mold unit 800 in the mold clamping process. Accordingly, power consumption is increased over the entire mold clamping process.

On the other hand, in a case where the lock-up is executed in the mold clamping process, the toggle mechanism 150 sets the link angle θ between the first link 152 and the second link 153 to 180° as shown in FIG. 6B. That is, since the first link 152 and the second link 153 are linearly arranged and supported to be pushed against each other, the mold clamping unit 100 can maintain the mold clamping state of the mold unit 800. In a case where the lock-up is executed in the mold clamping process, the driving of the mold clamping motor 160 can be stopped or the mold clamping motor 160 can be driven with low torque. Accordingly, power consumption can be reduced over the entire mold clamping process.

Returning to FIG. 5, the lock-up setting field 764a includes a switching button that switches between "use" in which the lock-up is executed and "non-use" in which the lock-up is not executed. The switching button switches between the execution and non-execution of the lock-up in a case where, for example, a user performs a touch operation or performs the pressing (the click of a mouse, or the like) of a pointer displayed on the display screen 761. Accordingly, for example, a user can reduce the power consumption of the injection molding by arbitrarily selecting whether to execute the lock-up.

The energy-saving holding pressure-setting field 764b is adapted such that a mode in which pressure in the holding pressure process is reduced at an appropriate timing can be set. For example, in energy-saving holding pressure, the torque of the injection motor 350 is reduced in the latter half of the holding pressure process to reduce pressure, so that the power consumption of the injection motor 350 is reduced. In the energy-saving holding pressure, the injection control unit 713 (see FIG. 3) of the control device 700 may switch torque at an appropriate timing or may gradually reduce the torque of the injection motor 350.

The energy-saving holding pressure-setting field 764b includes a switching button that switches between "auto", which is automatically performed, and "manual", which is performed according to a user's input, in a mode of the energy-saving holding pressure. The switching button is switched to "auto" or "manual" in a case where, for example, a user performs a touch operation or performs the pressing (the click of a mouse, or the like) of a pointer displayed on the display screen 761. In a case where "auto" is set, the control device 700 automatically sets an operation of the injection motor 350 in which distribution between pressure in the holding pressure process and power consumption is optimized. Accordingly, a user can reduce the power consumption of the injection molding by arbitrarily selecting the setting of "auto" of the injection motor 350.

The injection mode-setting field 764c is adapted such that the speed of the advance (the rise of injection) of the screw 330 at the time of start of the filling process can be set. That is, an injection mode refers to an operation that changes a time required to fill the mold unit 800 with a molding material by changing the rotating speed of the injection motor 350 at the time of start of the filling process.

The injection mode-setting field 764c includes a switching button that switches between "standard" in which the rise of injection is performed at a reference speed, "high speed" in which the rise of injection is speeded up, and "low speed" in which the rise of injection is delayed in the injection mode. The switching button is switched to "standard", "high speed", or "low speed" in a case where, for example, a user performs a touch operation or performs the pressing (the click of a mouse, or the like) of a pointer displayed on the display screen 761. Accordingly, a user can reduce the power consumption of the injection molding by arbitrarily reducing the rotating speed of the injection motor.

Meanwhile, the power screen portion 765 displays the power consumption based on the setting contents of the setting screen portion 762. The power screen portion 765 includes a measurement operation screen portion 766 in which the measurement of power consumption is operated, an injection molding-total power-screen portion 767 that displays power consumption (the cumulative amount of power) for a predetermined measurement time, and a process-screen portion 768 that displays power consumption of each process of the injection molding. The measurement operation screen portion 766, the injection molding-total power-screen portion 767, and the process-screen portion 768 are arranged in the power screen portion 765 shown in FIG. 5 in order from the left side to the right side, but this arrangement may be freely set.

The measurement operation screen portion 766 includes a measurement operation-input field 766a in which the execution and non-execution of the measurement of power consumption can be switched, and a measurement time-input field 766b to which a measurement time for power consumption can be input. The measurement operation-input field 766a includes a switching button that switches in a case where, for example, a user performs a touch operation or performs the pressing (the click of a mouse, or the like) of a pointer displayed on the display screen 761. The measurement time-input field 766b sets a measurement time for measuring power consumption in a case where a user inputs a numerical value. Alternatively, the measurement time-input field 766b may be adapted such that a plurality of pull-down type measurement times are displayed and a user selects any one of the measurement times.

It is preferable that the power consumption of the injection molding is the cumulative amount of power for one cycle in a case where each process (each of the metering process, the mold closing process, the pressurization process, the mold clamping process, the filling process, the holding pressure process, the cooling process, the depressurization process, the mold opening process, and the ejection process) is performed. For this reason, a measurement time for one cycle may be automatically calculated and displayed as a user sets the setting contents of the injection molding in the setting screen portion 762.

To allow a user to recognize the power consumption of the injection molding, the injection molding-total power-screen portion 767 includes a display field for each of "measurement state", "measurement time", "power consumption of motor", "power consumption of heater", and "total power consumption". The display field for "measurement state" displays the states of "during measurement", "non-measurement", "completion", and the like with regard to the power consumption of the injection molding. The display field for "measurement time" displays a measurement time for which power consumption is measured in the injection molding.

The display field for "power consumption of motor" displays cumulative power consumption used by a motor (the mold clamping motor 160, the metering motor 340, the injection motor 350, the ejector motor, and the like) in the injection molding. The display field for "power consumption of heater" displays cumulative power consumption used by a heater (the first heating unit 313, the second heating unit 323, and the like) in the injection molding. "Total power consumption" is a total of the power consumption of the motor and the power consumption of the heater. Alternatively, "total power consumption" may be the power consumption of the entire injection molding machine 10 to which the power consumption of other devices (various sensors, the control device 700, and the like) is added.

Meanwhile, the process-screen portion 768 displays a ratio of the power consumption of each of the plurality of processes to the power consumption of the injection molding over the entire measurement time (for example, one cycle). Accordingly, the display unit 760 allows a user to recognize information on the power consumption for each of the plurality of processes. The process-screen portion 768 according to the present embodiment shows a total of the power consumption of the injection molding, but the power consumption of each process may be the power consumption of only the motor or the power consumption of only the heater.

Here, since there are many processes of the injection molding as described above, there is a possibility that it is difficult for a user to recognize power consumption even though power consumption is displayed for each of all the processes. For this reason, in the present embodiment, some (five processes) of all the processes of the injection molding are selected and the power consumption thereof is used as information that is easily recognized by a user. Specifically, the process-screen portion 768 includes a mold opening/closing power field 768a, a filling power field 768b, a holding pressure power field 768c, a metering power field 768d, and an ejector power field 768e.

Further, each of the plurality of display fields 768a to 768e includes an item display 769a, a ratio numerical value display 769b, and a ratio bar display 769c. That is, information on the power consumption of each process of the injection molding is displayed as a ratio of the power consumption of each process to the power consumption of the entire injection molding. Accordingly, the power consumption of each process is used as information that is more easily recognized by a user. Furthermore, even though the respective processes of actual injection molding are different from processes of the plurality of displayed display fields 768a to 768e, a user is allowed to recognize the information on the power consumption of each process as contents absorbing (or not including) a deviation since the information on the power consumption of each process of the injection molding is displayed as a ratio. The display of the process-screen portion 768 is not limited to a ratio and, for example, a numerical value (actual result value), reduced power consumption, or a reduction effect (a mark, or the like) may be applied.

In FIG. 5, the respective display fields 768a to 768e are arranged in a vertical direction, and the item displays 769a, the ratio numerical value displays 769b, and the ratio bar displays 769c are arranged in a horizontal direction. The arrangement of these may be reversed. In the ratio bar display 769c, for example, the power consumption of the entire injection molding is divided into squares in units of 10%, and the squares are displayed to be filled from the left side to the right side according to a ratio of the power consumption. Further, the ratio bar display 769c may be displayed while the shade of a color is changed between a left square and a right square.

The mold opening/closing power field 768a displays a ratio of total power consumption of the respective processes (the mold closing process, the pressurization process, the depressurization process, and the mold opening process) related to the opening/closing movement (movement not including mold clamping) of the mold clamping unit 100 (see also FIG. 4). That is, there are many users who recognize the mold closing process and the pressurization process of the mold clamping unit 100 as a series of operations, and likewise, there are many users who also recognize the depressurization process and the mold opening process of the mold clamping unit 100 as a series of operations. For this reason, since total power consumption of the opening/closing movement of the mold clamping unit 100 is displayed, the total power consumption is used as information that is more easily understood by a user.

The filling power field 768*b* displays a ratio of the power consumption of the filling process in the mold clamping process (see also FIG. 4). The power consumption of the filling process includes power that is mainly used for an operation of the injection unit 300 and power that is mainly used for an operation (mold clamping process) of the mold clamping unit 100. In a case where a total of these powers on the same time axis is displayed in the filling power field 768*b* as the power consumption of the filling process, a user can easily recognize power that is used in the filling process.

Likewise, the holding pressure power field 768*c* displays a ratio of the power consumption of the holding pressure process in the mold clamping process (see also FIG. 4). The power consumption of the holding pressure process includes power that is mainly used for an operation of the injection unit 300 and power that is mainly used for an operation (mold clamping process) of the mold clamping unit 100. In a case where a total of these powers on the same time axis is displayed in the holding pressure power field 768*c* as the power consumption of the holding pressure process, a user can easily recognize power that is used in the holding pressure process.

The metering power field 768*d* displays a ratio of the power consumption of the metering process in the mold clamping process (see also FIG. 4). In this metering process, metering is performed by the metering motor 340 while the cooling process is performed in the injection unit 300, and the mold clamping process is continuously performed in the mold clamping unit 100. For this reason, in a case where a total of powers on the same time axis is displayed in the metering power field 768*d* as the power consumption of the metering process, a user can easily recognize power that is used in the metering process.

In a case where the cooling process is longer than the metering process, a time lag occurs between the metering process and the depressurization process (mold closing movement) in the injection molding machine 10, and the power of the mold clamping unit 100 and the power of the injection unit 300 continue to be used even during this time lag. However, since this time lag is small with respect to the duration of the entire injection molding, the power consumption of the time lag is intentionally not displayed. Alternatively, for example, the injection molding machine 10 may calculate and display the power consumption of a time lag such that the power consumption of a time lag is included in the power consumption of the metering process.

The ejector power field 768*e* displays a ratio of the power consumption of the ejection process for taking out molding products after the mold clamping unit 100 is moved to be opened (see also FIG. 4). Accordingly, a user is allowed to recognize the power consumption of the operation of the ejector unit 200.

Further, the display control unit 715 of the control device 700 has a function to change power consumption displayed in the power screen portion 765 in a case where an arbitrary item in the setting screen portion 762 (the main setting screen portion 763 or the auxiliary setting screen portion 764) is changed by a user. Specifically, as shown in FIG. 3, a setting content holding section 715*a* that holds setting contents changed by a user and a power consumption calculating section 715*b* that calculates power consumption for the held setting contents are provided in the display control unit 715.

That is, a user changes (inputs) the setting contents of the injection molding in the setting screen portion 762 via the operation unit 750. In a case where the setting content holding section 715*a* acquires the setting contents changed by a user via the input acquisition unit 716, the setting content holding section 715*a* temporarily stores the changed setting contents in the storage medium 702 and holds the changed setting contents as setting contents to be used to calculate power consumption.

The power consumption calculating section 715*b* calculates the power consumption of the injection molding on the basis of the changed setting contents. In this case, the power consumption calculating section 715*b* individually calculates the power consumption of the respective display fields (the mold opening/closing power field 768*a*, the filling power field 768*b*, the holding pressure power field 768*c*, the metering power field 768*d*, and the ejector power field 768*e*: see FIG. 5) of the process-screen portion 768.

For example, in a case where the setting contents related to the mold closing process, the pressurization process, the depressurization process, and the mold opening process are changed, the power consumption calculating section 715*b* calculates mold opening/closing power consumption that is to be displayed in the mold opening/closing power field 768*a*. Examples of the calculation of the amount of power include a calculation that is made after the changed setting contents are applied to a function or map information related to the power consumption of the motor or the heater in each process. Accordingly, the power consumption calculating section 715*b* can accurately estimate the mold opening/closing power consumption that is based on the changed setting contents.

Likewise, in a case where the setting contents related to the filling process are changed, the power consumption calculating section 715*b* calculates filling power consumption that is to be displayed in the filling power field 768*b*. Further, in a case where the setting contents related to the holding pressure process are changed, the power consumption calculating section 715*b* calculates holding pressure power consumption that is to be displayed in the holding pressure power field 768*c*. Furthermore, in a case where the setting contents related to the metering process are changed, the power consumption calculating section 715*b* calculates metering power consumption that is to be displayed in the metering power field 768*d*. Moreover, in a case where the setting contents related to the ejection process are changed, the power consumption calculating section 715*b* calculates ejector power consumption that is to be displayed in the ejector power field 768*e*.

Figure 7:
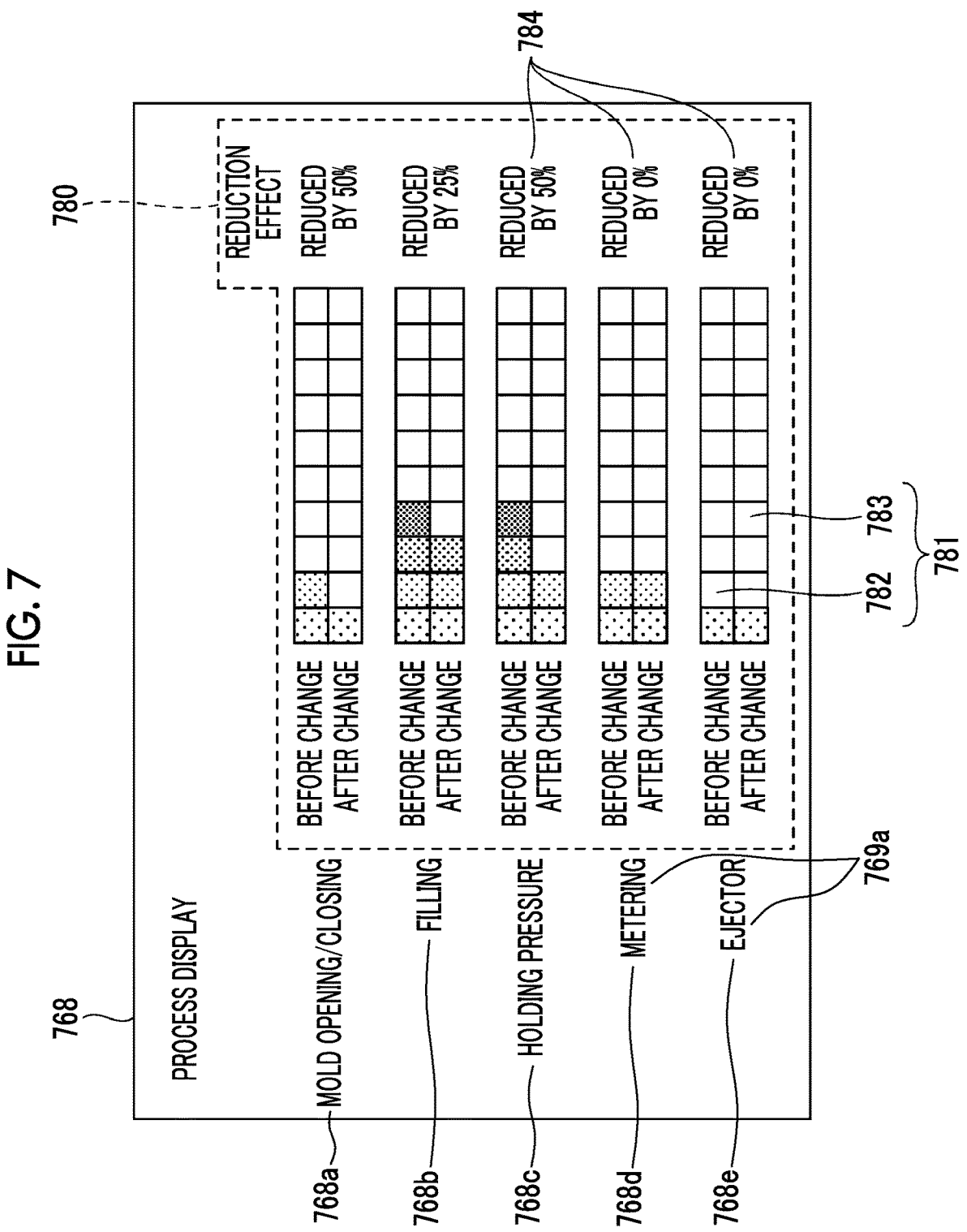
FIG. 7 is a diagram showing an example of a process-screen portion in a case where setting contents are changed.

In addition, in order to allow a user to easily recognize a change in the power consumption corresponding to the changed setting contents, the power consumption calculating section 715*b* calculates a ratio of the power consumption of each process (see also FIG. 7). For example, the power consumption calculating section 715*b* may calculate a ratio of the power consumption of each process corresponding to the changed setting contents to the power consumption of each process before change. Alternatively, the power consumption calculating section 715*b* may calculate the power consumption of the entire injection molding corresponding to the changed setting contents to calculate a ratio of the power consumption of each process to this power consumption of the entire injection molding.

Further, in a case where the setting contents of the injection molding are changed, the display control unit 715 changes a part of a display region of the process-screen portion 768 to another display as shown in FIG. 7. Specifically, the display control unit 715 switches portions (the ratio numerical value displays 769*b* and the ratio bar displays 769*c*), which are adjacent to the item displays 769*a* in the horizontal direction, to a pre/post-change display portion 780 while leaving the item displays 769*a* of the plurality of display fields 768*a* to 768*e*.

The pre/post-change display portion 780 displays ratio bar displays 781 and numerical value displays 784 for a reduction effect side by side in the horizontal direction. In the ratio bar display 781, for example, the power consumption of the entire injection molding is divided into squares in units of 10%, and the squares are displayed to be filled from the left side to the right side according to a ratio of the power consumption. The ratio bar display 781 may be displayed while the shade of a color is changed between a left square and a right square.

Further, the ratio bar display 781 of each of the plurality of display fields 768*a* to 768*e* is divided into two stages in the vertical direction, includes a pre-change bar display 782 on an upper side thereof, and includes a post-change bar display 783 on a lower side thereof. Each pre-change bar display 782 displays a ratio of the power consumption before change (a ratio of the power consumption of each process to the power of the entire injection molding) (see also FIG. 5). On the other hand, each post-change bar display 783 displays a ratio of the power consumption after change (a ratio of the power consumption of each process after change to the power consumption of each process before change).

Since a ratio of the power consumption of each process after change to the power consumption of each process before change is rounded off to increase or decrease in resolution in a plurality of stages (0%, 25%, 50%, 75%, 100%, and the like), the ratio does not need to be calculated as a detailed ratio. For example, in a case where a detailed ratio is less than 12.5%, the detailed ratio is rounded off to 0%. In a case where a detailed ratio is 12.5% or more and less than 37.5%, the detailed ratio is rounded off to 25%. Accordingly, the ratio is used as information that is easily recognized by a user.

A part of an example shown in FIG. 7 will be described. In a case where a ratio of the power consumption in the opening/closing of the mold before change is 20% of the power consumption of the entire injection molding, two squares are filled in the pre-change bar display 782. Meanwhile, in a case where the power consumption in the opening/closing of the mold after change is about 50% of the power consumption in the opening/closing of the mold before change, the display control unit 715 fills one square in the post-change bar display 783 (reduces the number of filled squares by one). Further, the display control unit 715 causes the numerical value display 784 for a reduction effect to display that the ratio is reduced by 50%.

Furthermore, for example, in a case where a ratio of the power consumption of the filling process before change is 36% of the power consumption of the entire injection molding, four squares are filled in the pre-change bar display 782. Meanwhile, in a case where the power consumption of the filling process after change is about 75% of the power consumption of the filling process before change, the display control unit 715 fills three squares in the post-change bar display 783 (reduces the number of filled squares by one). In addition, the display control unit 715 causes the numerical value display 784 for a reduction effect to display that the ratio is reduced by 25%.

Since the process-screen portion 768 displays the pre-change bar displays 782 and the post-change bar displays 783 together as described above, a user is allowed to easily visually recognize a change in the power consumption of each process. Moreover, since a reduction effect for power consumption is indicated as a numerical value by the numerical value display 784 for a reduction effect positioned adjacent to the ratio bar display 781, the reduction effect can be used as information that is further easily understood by a user. It goes without saying that the display control unit 715 may display only the power consumption of each process corresponding to the changed setting contents without displaying the power consumption of each process before change.

As described above, the control device 700 (display unit 760) of the injection molding machine 10 displays the setting screen portion 762 and the power screen portion 765 on the same display screen 761. Accordingly, a user can easily identify the setting contents of the injection molding and the power consumption of the injection molding based on the setting contents. Moreover, the display unit 760 can change information on power consumption on the basis of the setting contents, which are changed in the setting screen portion 762 by a user, to allow the user to easily set setting contents that are effective to reduce power consumption.

Further, the display unit 760 can display a ratio of the power consumption after the change of setting contents to the power consumption before the change of setting contents to allow a user to smoothly recognize a fluctuation in power consumption that is caused by the change. Moreover, the display unit 760 can display information on the power consumption before the change of setting contents (pre-change bar display 782) and information on the power consumption after the change of setting contents (post-change bar display 783) together to allow a user to easily compare the information.

With regard to the changed setting contents, a ratio of the power consumption of each process to the power consumption of the entire injection molding may be calculated, and a calculation result may be displayed in the post-change bar display 783. Even though the filled screen of the pre-change bar display 782 of each process and the filled screen of the post-change bar display 783 of each process are switched, a user can recognize that a change in power consumption occurs.

Further, for example, in a case where setting contents are changed, the display control unit 715 may calculate and display power consumption corresponding to each display field of the injection molding-total power-screen portion 767 without being limited to changing the display of the process-screen portion 768. That is, the power consumption calculating section 715*b* calculates the power consumption of the motor of the entire injection molding related to the changed setting contents according to the display field for "power consumption of motor". Further, the power consumption calculating section 715*b* calculates the power consumption of the heater of the entire injection molding related to the changed setting contents according to the display field for "power consumption of heater". Furthermore, the power consumption calculating section 715*b* calculates the power consumption of the entire injection molding related to the changed setting contents according to the display field for "total power consumption".

Further, the display control unit 715 displays the power consumption of the motor, the power consumption of the heater, and total power consumption, which are calculated by the power consumption calculating section 715*b*, in the injection molding-total power-screen portion 767. The injection molding-total power-screen portion 767 may display the power consumption of the respective display fields ("power consumption of motor", "power consumption of heater", and "total power consumption") of the changed setting contents and actual result values of power consumption, which are measured in the previous injection molding, together, or may display only calculation results alone. In a case where the power consumption of the changed setting contents and the measured actual result values of power consumption are displayed together, a user more easily recognizes a reduction effect for the entire power consumption caused by the setting contents.

Furthermore, it is preferable that the display control unit 715 changes the display state (the color of characters, a background color, or the like) of the setting contents, which are changed in the setting screen portion 762 by a user, from the display state of an unchanged portion to display the display state of the changed setting contents. The change of the display state may include display processing, such as the blinking or highlighting of a changed portion. Accordingly, the display unit 760 allows a user to easily recognize a changed portion of the setting contents. In addition, the display control unit 715 may perform processing, such as changing a display state before change to another display state, to also display the power consumption (the power consumption of the entire injection molding, a ratio of the power consumption of each process, and the like) changed on the basis of the setting contents that are changed by a user.

The display unit 760, the control device 700, and the injection molding machine 10 according to the embodiments disclosed herein are exemplary in all respects, and are not limited. The embodiments can be modified and improved in various forms without departing from appended claims and the scope of the claims. The items described in the plurality of embodiments may include other components within a consistent range, and may be combined within a consistent range.

It should be understood that the invention is not limited to the above-described embodiment, but may be modified into various forms on the basis of the spirit of the invention. Additionally, the modifications are included in the scope of the invention.

What is claimed is:

1. A device comprising:
a display screen;
one or more processors; and
a memory storing instructions thereon, the instructions when executed by the one or more processors causing the one or more processors to display on the display screen a setting screen portion that displays setting contents of injection molding and a power screen portion that displays predicted power consumption of the injection molding to be executed based on the setting contents before executing the injection molding, the setting screen portion and the power screen portion being displayed side by side on the display screen to be visually recognizable without requiring a user to perform a manual switching operation,
wherein the setting screen portion is capable of changing the setting contents on the basis of an operation of the user,
in a case where the setting contents are changed by the user, the display screen displays a first power consumption and a second power consumption side by side in a visually comparable form and the one or more processors estimate a reduction effect of power consumption based on the first power consumption and the second power consumption, and cause the display screen to display the reduction effect on the power screen portion wherein the power screen portion displays the predicted power consumption for each of a plurality of processes of the injection molding, and
the first power consumption is derived based on the setting contents before the change, and the second power consumption is estimated based on the setting contents after the change.

2. The device according to claim 1,
when the user has changed the setting contents using the setting screen portion, the display screen maintains a state in which the setting screen portion and the power screen portion are displayed side by side and changes the predicted power consumption based on the setting contents changed by the user using the setting screen portion.

3. The device according to claim 2,
wherein the predicted power consumption of each of the plurality of processes before the change of the setting contents is determined as a ratio of the power consumption of each of the plurality of processes to the power consumption of the entire injection molding.

4. The device according to claim 2,
wherein the predicted power consumption of each of the plurality of processes after the change of the setting contents is determined as a ratio of power consumption of a predetermined process after the change of the setting contents to power consumption of the predetermined process before the change of the setting contents.

5. The device according to claim 2,
wherein the power screen portion displays power consumption of each of the plurality of processes before the change of the setting contents and information on predicted power consumption of each of the plurality of processes after the change of the setting contents together.

6. The device according to claim 1,
when the user has changed the setting contents using the setting screen portion, the display screen changes the predicted power consumption based on the setting contents changed by the user using the setting screen portion without executing a molding cycle.

7. The device according to claim 1,
wherein the setting screen portion changes a display state of a portion in which the setting contents are changed from a display state of an unchanged portion.

8. The device according to claim 1,
wherein the setting screen portion includes
a main setting screen portion in which first setting contents are capable of being set on the basis of an input of a numerical value or a selection of an option performed by the user, and
an auxiliary setting screen portion in which second setting contents, which are items other than the setting contents set in the main setting screen portion and affect the power consumption of the injection molding, are capable of being set.

9. The device according to claim 8,
wherein the auxiliary setting screen portion includes a lock-up setting field in which lock-up execution or lock-up non-execution is selected, the lock-up execution being for locking a mold clamping state of a toggle mechanism to stop driving of a mold clamping motor or to reduce torque of the mold clamping motor, the lock-up non-execution being for driving the mold clamping motor to maintain the mold clamping state of the toggle mechanism.

10. The device according to claim 8,
wherein the auxiliary setting screen portion includes an energy-saving holding pressure-setting field in which automatic setting for optimizing an operation of an injection motor to reduce power consumption of the injection motor in a holding pressure process of the injection molding or manual setting for allowing the user to set an operation of the injection motor is selected.

11. The device according to claim 8,
wherein the auxiliary setting screen portion includes an injection mode-setting field in which a rotating speed of an injection motor at a time of start of a filling process of the injection molding is set.

12. A control device provided in an injection molding machine and comprising the device according to claim 1.

13. An injection molding machine comprising:
the device according to claim 1.

14. The device according to claim 1, wherein the display screen displays the reduction effect for each of the plurality of processes of the injection molding.

\* \* \* \* \*